Jan. 27, 1953

J. RAZEK 2,627,058

CONTROL OR METERING SYSTEM

Filed April 15, 1947

INVENTOR.
Joseph Razek
BY
Busser & Harding
ATTORNEYS

Jan. 27, 1953

J. RAZEK 2,627,058

CONTROL OR METERING SYSTEM

Filed April 15, 1947

INVENTOR.
Joseph Razek
BY
Busser & Harding
ATTORNEYS

Jan. 27, 1953 J. RAZEK 2,627,058
CONTROL OR METERING SYSTEM
Filed April 15, 1947 5 Sheets-Sheet 5

INVENTOR
Joseph Razek
BY
Busser & Harding
ATTORNEYS

Patented Jan. 27, 1953

2,627,058

UNITED STATES PATENT OFFICE 2,627,058

CONTROL OR METERING SYSTEM

Joseph Razek, Llanerch, Pa., assignor, by mesne assignments, to Reconstruction Finance Corporation, Philadelphia, Pa., a corporation of the United States Application April 15, 1947, Serial No. 741,540

9 Claims. (Cl. 318—28)

1

This invention relates to control or metering systems. In view of the fact that it is adapted to remote positioning of its transmitting and responsive elements the invention is adapted in particular for remote control or telemetering.

A control or metering system involves the positioning of one element in accordance with the position of another element dependent upon the variation of some physical quantity such as temperature, pressure, humidity, flow, potential or the like. The dependent element is arranged in the case of control devices to operate some element, such as a valve or rheostat, to reestablish the original value of the variable, or in the case of metering applications is arranged to move a stylus or other indicating or recording device. In any case, it is essential that the two elements be located accurately with respect to each other at all times and that the movement of the dependent element to its proper position should take place at a high rate of speed. These two requirements are generally obtainable simultaneously only with difficulty in that high accuracy cannot usually be obtained at high speed without excessive hunting.

In accordance with the present invention high speed of response and a high degree of fidelity of response may be consistently secured.

The use of an impedance bridge has been suggested for the purpose of securing corresponding positions of a transmitting and receiving element. If, in such a bridge, a displacement of a transmitting element changes an impedance in one branch of the bridge it would appear that the unbalance of the bridge could be used for the purpose of positioning a receiver element to restore balance in such fashion that the receiver element at balance would bear a definite relationship to the transmitting element. In the case of a bridge made up of resistance a null condition of a galvanometer may be secured to produce the desired results. Generally speaking, however, a resistance bridge involves the objection that the transmitting element must overcome friction, for example, by moving a contact over a resistance, and the work required is frequently not permissible. Accordingly, an impedance bridge in which a movable iron core changes an inductance or in which a movable set of plates changes a capacity is to be preferred since the forces required for such changes may usually be made quite negligible. A bridge involving variable reactances, as contrasted with resistances, involves the practical difficulty that it is usually impossible to produce a reduction of output current to zero: the best result which is obtainable generally being a minimum signal.

In accordance with the present invention this difficulty is overcome in a bridge comprising reactance elements by securing an indication of balance, not by a zero or minimum output current or voltage, but by providing means highly sensitive to a phase shift. Consideration of a vector diagram representing voltages existing in a bridge will show that when the bridge is balanced from the standpoint of equal reactances (though not necessarily equal resistances) the voltage existing across the detector will be 90° out of phase with the impressed voltage across the bridge. Furthermore, in passing through the balanced condition the detector voltage will have a continuous phase shift rather than merely a minimum value so that, depending upon whether the phase condition is less or greater than 90° with respect to the input voltage, there can be determined the direction of unbalance so that the responding apparatus may be made to move the receiving element in the right direction to restore balance.

It may be noted that while the invention is particularly adapted to reactance bridges in which inductive reactances are involved, it is equally applicable to bridges in which the elements may be capacities or resistances; in particular, it is useful for resistance thermometer measurements or control.

Furthermore the term "bridge" is used herein broadly: various known networks having bridge characteristics of balance but which are not of a type having the usual Wheatstone array of elements may be used.

The present invention relates to the accurate determination of a phase condition in the vicinity of a balance point whereby balance may be automatically obtained at high speed without hunting. In the accomplishment of this object the invention comprises novel circuit elements of even more general application and, accordingly, the accomplishment of the object outlined above as well as other objects of the invention may be best made apparent from the following description read in conjunction with the accompanying drawings in which:

Figure 1:
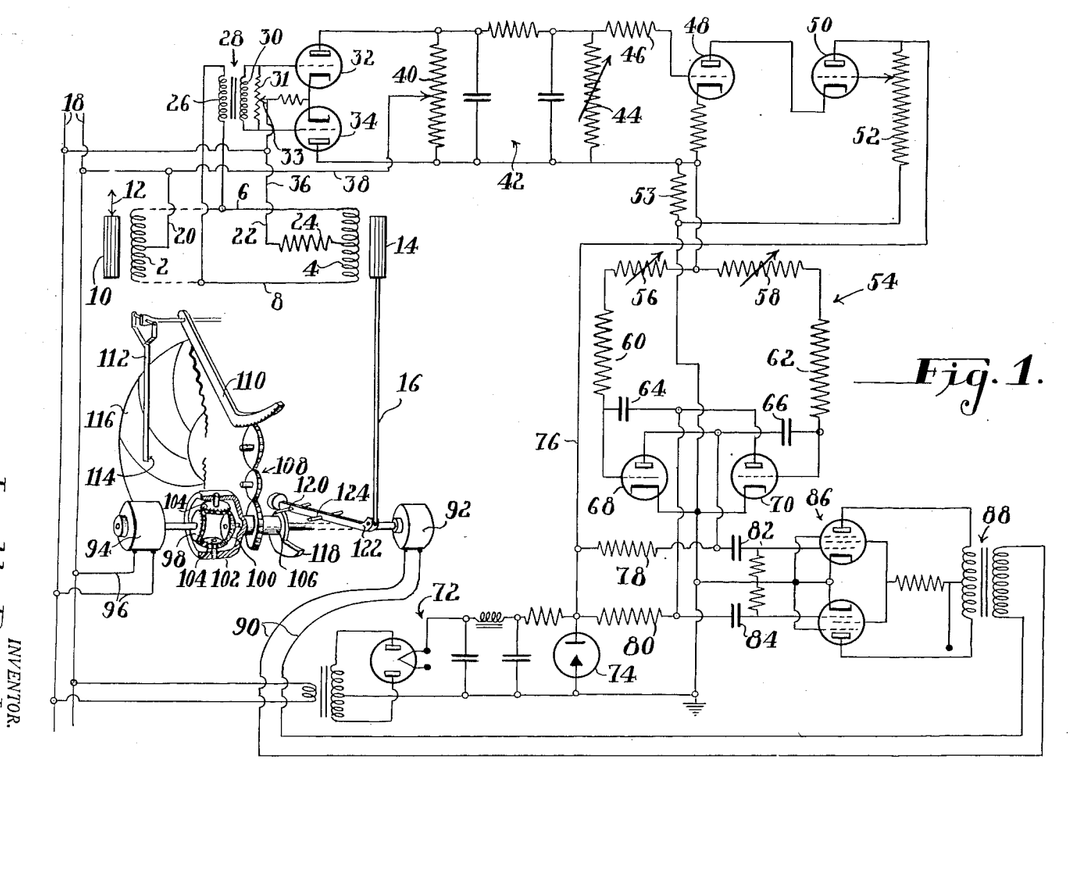
Figure 1 is an electrical diagram, illustrating diagrammatically also certain mechanical elements in accordance with one embodiment of the invention.

Referring first to Figure 1 there is illustrated an impedance bridge comprising center-tapped coils 2 and 4 joined at their ends by connections 6 and 8. The coil 2 which may be considered the transmitting coil is provided with an iron core 10 arranged to be moved in opposite directions as indicated by the arrows 12 in accordance with the value of some physical variable. As will be readily understood this variable may be substantially anything which either directly or through mechanical or electrical amplification can be caused to move the core. Liquid level, pressure, temperature, rate of flow, current, potential, centrifugal force, weight etc. may be cited as typical variables which may be used to move the core directly or indirectly and which it may be desired to record or utilize for control purposes.

The second coil 4 of the bridge has its impedances correspondingly varied by a core 14 which, as pointed out hereafter, is movable by a mechanism through a connection diagrammed at 16.

It is, of course, to be understood that this impedance bridge may take many other forms than that illustrated as will be evident to those skilled in this art; for example, only one half of each coil may be subject to reactance variation, the other half being fixed or being replaced by a resistance or suitable capacity. Similarly, the coils may be replaced by capacities which are variable in such fashion that balance may be attained through the movements of one while the other occupies any arbitrary position. In fact, it will be evident that the variable arms of the impedance bridge may be made up of resistances variable, for example, with temperature, the remaining parts of the apparatus as will be presently shown being adapted for response in general to unbalance of an impedance bridge. Accordingly, the bridge may be any of the many known types of impedance bridges, but for simplicity of description it will be assumed that the bridge is of the type illustrated in which upper and lower halves of two coils may have their reactances varied by the movement of cores.

The bridge is supplied with commercial frequency alternating current from mains indicated at 18 through the connection 20 and through the resistance 24 connected to the respective center taps of the bridge components. The output of the bridge is taken from the connections 6 and 8 to the primary 26 of transformer 28. It may be here noted that the two coils or similar elements of the bridge may be remote from each other as indicated by the dotted portions of the connections 6 and 8 so that the apparatus may be used for telemetering.

The output of the transformer secondary 30 is imposed on the grids of the triodes 32 and 34. The connected cathodes of these triodes are joined at 36 to one side of the alternating current supply mains, the other side of which is connected to the anodes of the triodes through the line 38 having a variable contact, for balancing purposes, with a resistance 40 joining the plates of the tubes. The output voltage appearing across the plates is fed through a filter system indicated at 42 to provide a direct potential across a variable resistance 44.

As will be evident hereafter the triodes 32 and 34 may consist of other vacuum or gas tube assemblies and may, in practice, be in the same envelope. The same may be true of other electrode assemblies specifically illustrated as in separate envelopes. Accordingly when electron tubes are referred to hereafter the term may be construed to include such assemblies as may involve multiple electrode assemblies in a common envelope, i. e., a plurality of tubes from the standpoint of function in a single physical envelope. In such arrangements two cathodes, from the standpoint of effect, may be constituted by a single physical cathode.

It may be here noted that, if the triodes 32 and 34 are substantially identical, the cathode return, through the common cathode resistor, may be connected directly to a center top of the transformer secondary 30; however, using commercial tubes at 32 and 34 it is desirable to shunt a potentiometer resistance 31 across the transformer secondary and make the cathode connection to the variable contact 33 of this potentiometer. Then adjustment may be easily made to render the system independent of line voltage variations. In the subsequent modifications showing the same phase detector this potentiometer is omitted, but it will be understood that it may be used whenever desired.

Before proceeding further with the explanation of the circuit shown in Figure 1 there may be discussed the nature of the voltage which appears across the resistor 44.

Figure 2:
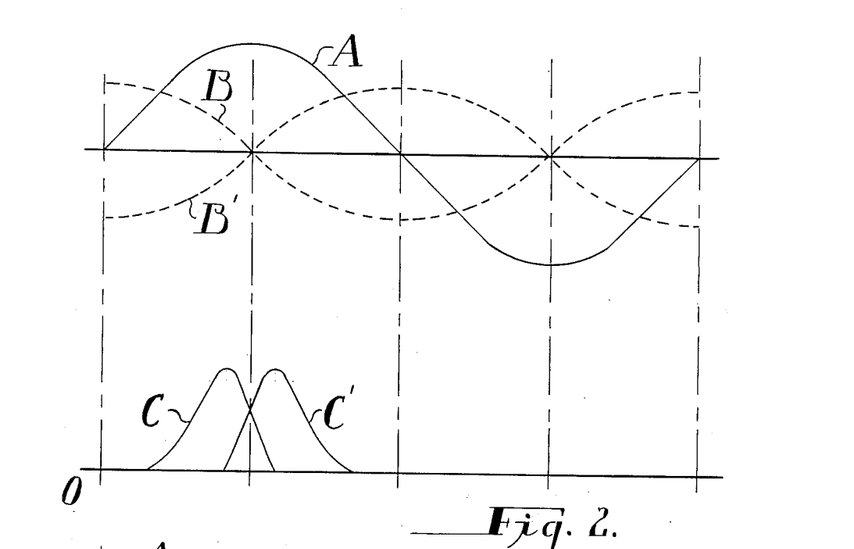
Figures 2 and 3 are explanatory diagrams illustrating the fashion in which responses are secured and caused to control balance of the system.

Referring to Figure 2, there is indicated at A a single cycle of the alternating supply voltage applied to the anodes of the tubes 32 and 34. These tubes may, of course, be conductive only when the positive half cycle is applied to their plates.

Assuming a balance of reactances in the bridge, but not necessarily a balance of resistances, the potential output of the bridge will be a minimum but will not be zero. In fact, in the present apparatus it is desirable that the resistances should not be balanced so that there will be an actual current output to the transformer 28. Under the circumstances mentioned the potential appearing between the lines 6 and 8 will be 90° out of phase with the potential A of the supply to both the bridge and to the tubes. The potential thus existing will give rise, through the transformer 28, to the potentials B and B' at the grids of the tubes 32 and 34, B being assumed the potential applied through the transformer to the grid of the tube 32, and B' being assumed to be the potential applied to the grid of the tube 34. Considering the tube 32 from the zero time in Figure 2, its anode potential rises from a zero value, its grid being positive. Accordingly, through the first quarter of the cycle its current will rise from a substantially zero value through a peak and will then decrease, reaching cut off shortly following the first quarter of the cycle when the grid potential becomes sufficiently negative. In the cycle, accordingly, there will be obtained a pulse of anode current as indicated at C. In similar but reverse fashion a pulse of anode current as indicated at C' will occur in the tube 34, this pulse rising from a cut off value prior to the end of the first quarter of the cycle to a maximum and then decreasing substantially to zero before the end of the first half cycle. If, by proper adjustment of the tap on the resistance 40, a suitable balance is made, to take into account differences in characteristics of the tubes 32 and 34, which are desirably as nearly alike as possible, the two pulses may be made substantially equal, at least in their average values, with the result that, in view of the balanced connections of the tubes, there will be a zero direct output potential across the resistance 44. It should be noted that if the bridge network is of a type giving rise to large signals, these peaks may be considerably flattened by reason of the fact that the tubes may be driven to saturation. What is illustrated, however, is sufficient for explanatory purposes.

Figure 3:
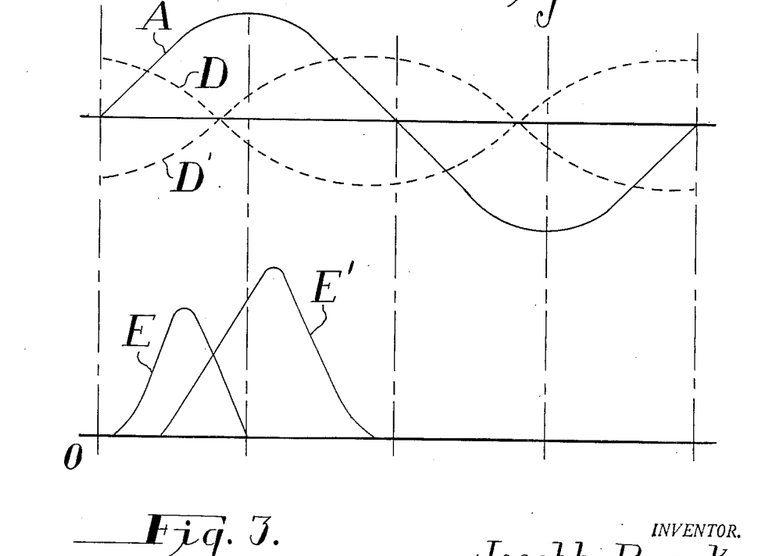

In contrast with the above, let it be assumed that the bridge is unbalanced. If unbalance occurs in one direction there will exist the conditions illustrated in Figure 3 in which, while the grid voltages D and D' are still 180° out of phase with each other, they are no longer 90° out of phase with the anode potential represented at A. Assuming that the phase displacement exists as in Figure 3, it will now be evident that during a corresponding positive half cycle of the anode potential, the grid potential of the tube 32 is more negative than before with the result that the anode current pulse E which occurs in the tube 32 is smaller in magnitude than previously and is shifted somewhat to the left. Under the same conditions the anode current pulse E' through the tube 34 is of greater magnitude than previously, inasmuch as its grid through the half cycle is on the average more positive. In view of the inequality of the two pulses it will be evident that an average direct current will now flow through the resistance 44 and the direction of this current will depend upon the direction of shift of the phase relationship. Since this phase relationship between the output and input voltages in the bridge varies continuously through the point of balance it will be evident that the direction of flow of current in the resistance 44 will be indicative of the direction of unbalance of the bridge. Consequently, it is available to determine the direction of proper adjustment of the core 14 for reattainment of balance. It may be remarked that even though pulses such as C and C' may not be exactly equal at the 90° phase condition, their relative variations with changes from that condition is so great that adjustment to zero direct output potential may be readily secured very closely corresponding to the 90° phase condition. Using commercial voltage supply (for example 110 volts) the potential across resistance 44 may be made extremely sensitive to change of position of the cores 10 and 14, passing from a quite high value of one sign through zero at balance to a quite high value of opposite sign for minute movements of the cores.

The output voltage across the resistance 44 is fed to the grid of the triode 48 which is connected to a second triode 50 by reason of the fact that the anode of the triode 48 is directly joined to the cathode of the triode 50. (Two triodes are sometimes commercially connected in this fashion in a single envelope.) The grid of the triode 50 is connected to a variable tap on a resistance 52 connected between the anode of the triode 50 and one end of a resistor 53, the other end of which is connected to one end of the variable resistance 44 as indicated.

A conventional multivibrator 54 is provided as indicated, comprising variable resistances 56 and 58 in respective series with fixed resistors 60 and 62 in conjunction with condensers 64 and 66 connected to the elements of triodes 68 and 70 as illustrated. The cathodes of the triodes 68 and 70 are connected to each other and to the lower end of the resistance 53. The junction of the resistances 56 and 58 is connected to the upper end of the resistance 53. It will thus be evident that a potential is applied between the cathodes of the multivibrator triodes and the circuit of the grids thereof, the value of which is dependent upon the potential across the resistance 44. The multivibrator has the characteristic that its frequency is dependent upon this applied potential and by design in accordance with known principles it may be made quite sensitive to potential changes so that even a quite small potential change may produce a very substantial change in frequency.

A conventional power supply 72 with its direct output voltage controlled by a voltage control tube 74 supplies the high direct voltage for the portions of the apparatus described above. The anode of the triode 50 is connected to the power supply through the connection 76. Resistors 78 and 80 respectively join the positive terminal of the power supply to the anodes of the triodes 70 and 68. In order to utilize the output current of the multivibrator the anodes of the triodes 68 and 70 are coupled through the condensers 82 and 84 to a push-pull amplifier 86 of conventional type which delivers its output of alternating current through the transformer 88 to the line 90.

The balance restoring mechanism comprises a synchronous motor 92 (for example of self-starting clock type) driven by the current delivered thereto through the line 90. A second similar synchronous motor 94 is driven at substantially constant speed through the connections 96 to the alternating current supply lines 18. The motors 94 and 92 respectively drive the bevel gears 98 and 100 of a planetary gear mechanism which comprises a cage 102 carrying the bevel pinions 104 which mesh with the gears 98 and 100. The cage 102 is carried by a sleeve 106 rotatable on the shaft of the motor 92, which sleeve, through gearing indicated at 108, may drive a gear segment 110 to which is secured a stylus 112 carrying a pen 114 arranged to mark a chart 116 for recording purposes. A cam 118 of suitable shape carried by the sleeve 106 acts on the follower pin 120 of a weighted lever 122 pivoted at 124 which, through a link connection 16 serves to move the core 14 previously described. The cam 118 may be so cut that the movement of the pen will bear any predetermined relationship to the variable giving rise to movement of the armature 10, so that, for example, linear, square root, or other responses may be secured depending upon the contour of the cam.

It will be evident that the segment 110 may serve not only to move a stylus but may be used additionally or solely to exercise control, through a valve, rheostat, or the like, of the variable to which the core 10 responds.

The operation of the apparatus up to the point of production of a potential across the resistance 44 has been described. This potential, through the amplifying means, controls the frequency of the multivibrator which drives the motor 92 in such fashion that this motor 92 may operate at either a higher or lower speed than the motor 94, depending upon the displacement of the core 10 from a position of balance. The initial setting of the multivibrator may be such that with zero potential appearing across the resistance 44 its frequency will drive the motor 92 at approximately the same speed as that of the motor 94. However, it will be understood that this is not necessarily the case since, using a multivibrator of high sensitivity to the potential applied thereto, the speed of the motor 92 may be varied to such a substantial extent that only a very slight movement of one of the cores 10 or 14 may produce a very substantial change in the speed of the motor 92. It has been found, for example, in practice that a movement of a core of a thousandth of an inch may produce a change of potential of one volt across the resistance 44. This one volt change, in turn, using the indicated amplification to feed the multivibrator, may cause a change in frequency of about ten cycles per second using a multivibrator having a normal frequency of sixty cycles per second. It will accordingly be evident that the differential mechanism may be caused to restore balance in a fashion involving extreme precision of relationship between the two cores 10 and 14.

By causing the multivibrator to have a large change of frequency with respect to the applied potential the apparatus is, furthermore, made very insensitive to the slight changes of frequency which occur in commercial alternating current lines; in other words, these slight frequency changes will correspond only to negligible compensating movements of a balancing element such as the core 14. Likewise the system, from the standpoint of variation of corresponding positions of the cores or other variable impedance elements is quite insensitive to changes in constants of the multivibrator due to temperature or other changes.

The speed of response of the receiver is dependent upon the extent of movement of the core 10 from a previously established equilibrium and thereafter upon the degree to which the position of the receiver core 14 approaches the new equilibrium position. The rapidity of response of the system may be made very great but nevertheless hunting will not occur.

That hunting of the system is impossible may be easily demonstrated. The speeds of the motors 94 and 92 are proportional to the fixed supply frequency $f_0$ and the oscillator frequency $f$ respectively, a condition which will exist if light parts are used and friction imposes no such load as will cause the motors to depart to any appreciable extent from synchronous operation. The velocity $\dot{s}$ of the sleeve 106 will be proportional, by reason of the planetary gear arrangement, to the difference of the frequencies, or:

$$\dot{s}=K(f-f_0)$$

Now $f=f(s)$, a function of the displacement of the core 14, and consequently of the sleeve 106, from the point of balance for any given position of the core 10. Within the range of operation of the multivibrator, it is evident that $f(s)$ has a bounded first derivative $f'(s)$, i. e., the multivibrator has no sudden changes of frequency with change of position of the core 14. Hence, differentiating the foregoing equation:

$$\ddot{s}=K\cdot f'(s)\cdot \dot{s}$$

Accordingly, when $\dot{s}=0$, $\ddot{s}=0$, precluding the motion from being oscillatory.

The speed of rebalancing is roughly proportional to the amount of unbalancing, resulting in high speed of restoration of balance but without hunting.

The elements bringing about rebalancing, namely the two synchronous motors, are continuously running which means that not only is there avoided any dead region or zone such as will result when a rebalancing system comes to rest between operations but there is no starting friction involved. With sufficient amplification from the multivibrator the motor 92 as well as the motor 94 may be chosen sufficiently powerful to secure ample torque for any desired purposes.

There is no sensitive element required such as a sensitive galvanometer or relays or the like to determine the direction in which the system should operate for rebalancing. Consequently, the system may be used on board ships or aircraft or in other locations which may be subject to violent motion or vibration.

Physical contact need not be made with the element, the position of which is to be recorded. For example, a core such as 10 may be located inside a manometer while the bridge coils, the inductances of which it varies, may be outside the manometer. This means that the transmitter plunger may be within a device in which very high pressures may exist or which may contain noxious or otherwise dangerous vapors or gases.

Not only may a transmitting core or member such as 10 be employed in conjunction with a stationary coil or cooperating member but it is possible to have a plunger such as 10 movable and associated with movable coils the positions of which may change in accordance with variations in a second variable. For example, by making one element movable as a function of speed and the other movable as a function of flow or the like, the quantity transmitted for recording, observation or control may be some combined function of the initial variables as, for example, in the particular case just mentioned, the quantity transmitted for measurement or control purposes might be the displacement of a vehicle or the like per unit quantity of fuel.

While there has been specifically described the variation of speed of a motor 92 by change of frequency of a supply system it will be evident that the change of speed of a motor may be otherwise accomplished; for example, if a direct current motor is used, speed variation may be accomplished by change of field current under control of the output voltage appearing across a resistance such as 44.

Figure 4:
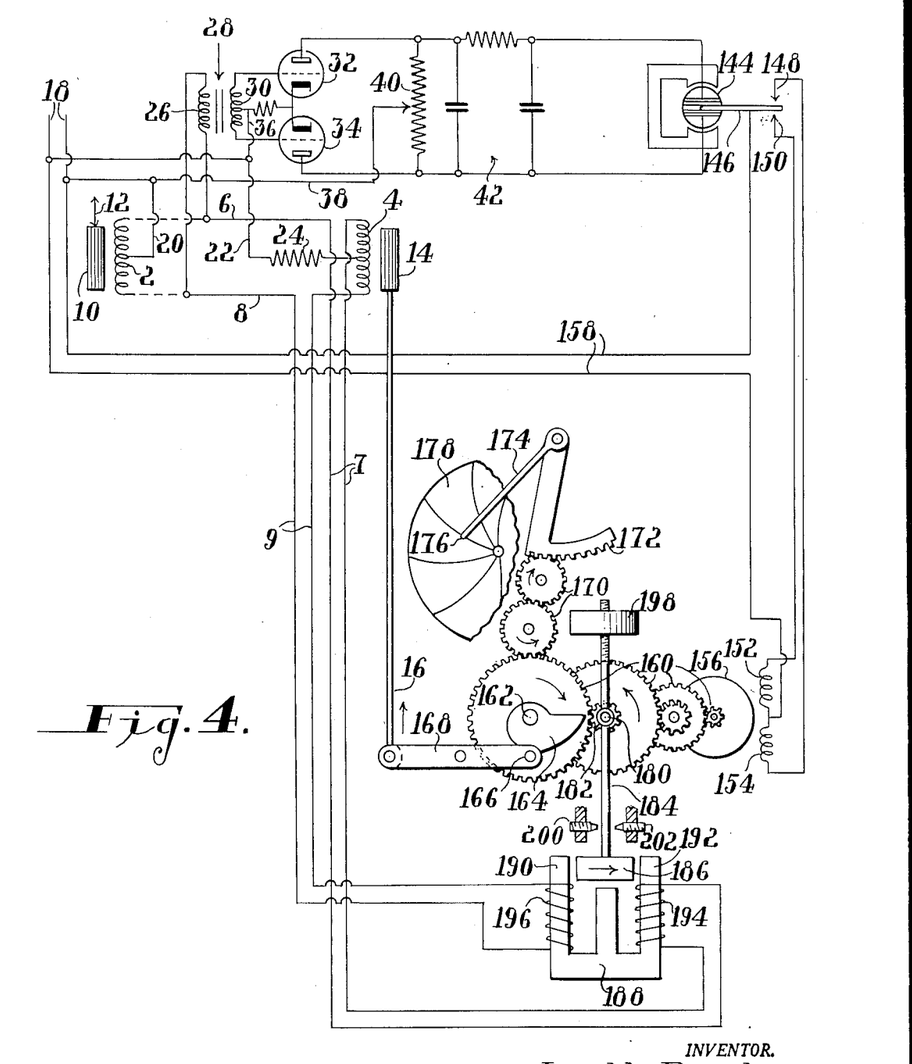
Figure 4 is a diagram similar to Figure 1 but illustrating another modification of the invention and involving an improved type of feedback.

Figure 4 discloses a modification involving a feed-back system which modifies the electrical characteristics of the bridge so as to adjust it, in effect, toward balance in advance of the balance which would be effected by the impedance adjustment tied up with displacement of a recording, indicating or controlling means. In the modification of Figure 1 there is no hunting; in the case of the modification of Figure 4 there is imperceptible hunting.

In brief, modification of Figure 4 may be said to involve anticipation of balance of a bridge so as to limit the overrun or hunting of the motor which moves the element producing the balancing action. Through means providing reduction of motion the motor itself is permitted to hunt while, nevertheless, the output motion used for recording or control purposes is without perceptible hunting movements. Actually, the hunting of the motor is highly desirable since the parts are thus kept continuously in motion to avoid any dead zone in the system as a result of static friction. The system is highly sensitive and, nevertheless, rapid and accurate in operation.

As will be evident from comparison of Figures 1 and 4, the modification illustrated in the latter figure contains a number of elements similar to those in Figure 1 and having identical functions so that they are in Figure 4 designated by the same reference numerals and need not be again specifically described. The impedance bridge in Figure 4 will be found to be the same as that in Figure 1 with the exception of the side branches 7 and 9 which involve the feedback as hereafter described in detail. If these side conections are disregarded the bridge characteristics and the characteristics of the phase-sensitive balance detector is the same as previously described. At balance a zero potential appears across the output of the filter 42; with unbalance in either direction a potential of corresponding sign will appear across the filter output terminals. In the present instance instead of having the potential output feed an amplifier a current is caused to flow through a polarized relay indicated at 144 consisting, for example, of a galvanometer movement having a winding and movable in a magnetic field of a permanent magnet. The movable element of this relay carries a contact arm 146 arranged to engage selectively contact points 148 and 150 as it moves in respective opposite directions depending upon the direction of flow of current through the winding.

The relay contacts 148 and 150 are connected to field coils 152 and 154 of a motor, the armature of which is indicated at 156. Connections 158 to the field coils and to the movable relay element 146 from the lines 18 serve to provide for the selective energizing of the field coils depending upon the direction of movement of the relay 144 which, in turn, depends upon the direction of flow of current therethrough corresponding to the direction of unbalance of the bridge. The motor may be of any suitable type having either a wound or unwound armature, the direction of movement of which is dependent upon the field coil which is energized. Any suitable type of relay may, of course, be used, including a relay system utilizing gas-filled, grid-controlled tubes as will be readily apparent to those skilled in the art and as also indicated hereafter. The result to be attained is merely a reversal of direction of operation of a motor with reversal of the potential which appears across the relay 144. The relay, in any event, is desirably sensitive so that there will substantially never occur a condition in which the motor is not operating in one direction or the other.

The motor armature 156 drives through reduction gearing indicated at 160 an output shaft 162. In a typical arrangement which may be cited to indicate the characteristics of the device, a reversing motor operating at 1800 R. P. M. serves to drive an output shaft at approximately 12 R. P. M., this speed being sufficient to secure a highly satisfactory degree of rapidity of response of the system. The shaft 162 carries a cam 164 acting upon the follower pin 166 carried by a lever 168 to which is pivoted the link connection 16 serving to move the core 14. Additionally, gearing 170 drives the segment 172 of a recording device including the arm 174 secured to the segment and carrying a pen 176 arranged to trace a curve on a chart 178 driven by an electrical or spring-operated clockwork mechanism. The segment 172 may, of course, additionally control any suitable means such as a valve, rheostat, or the like for control of the variable to which the core 10 responds. It is to be understood that, as in the case of the previously described modification, the output of the device may be utilized quite generally for recording, indicating, and/or control purposes. Like the cam 118 previously described, the cam 164 may be shaped to secure any desired response characteristic.

If the device comprised only the elements so far described it is evident that rapidity of response would be accompanied by excessive hunting. If, for example, the motor was seeking to achieve balance following the production of an unbalanced position of the impedance bridge, when the balance point was attained the relay 144 would immediately tend to reverse the motor but this could not occur instantly so that the motor would overrun and then reverse. Upon this reversal there would again be an overrun with the result that the core 14 would move back and forth across its balanced position with resulting oscillation of the pen 176 on the chart resulting ordinarily in what would amount to a widened curve drawn thereon. Such a condition could be corrected, but at the expense of speed of operation, by increasing the reduction from the motor to the output shaft.

In accordance with the present invention a shaft 180 in the reduction train by operating at a substantially higher speed than the output shaft is caused to control balance anticipation means to minimize the overrunning tendencies of the motor. As an example there may be used a shaft rotating, say, at five times the speed of the output shaft 162. As will be evident, the motor shaft could possibly be used to drive the mechanism about to be described but the normally very high motor shaft speed would result in excessive wear and vibration so that it is desirable to utilize a shaft speed intermediate the speeds between the motor shaft and the output shaft.

The shaft 180 carries the hub 182 of an arm 184. The hub fits the shaft in such fashion that while substantially free rotation of the shaft is unrestricted there will be sufficient friction to cause the shaft to swing the hub and the parts carried thereby. The arm 184 supports an armature 186 for movement between the legs 190 and 192 of a core 188 on which legs are wound coils 196 and 198, respectively, connected, through connections 7 and 9, in the lines 6 and 8 joining the coils 2 and 4. As will be evident the central leg of the core 188 acts in conjunction with the armature 186 so that as the armature 186 moves toward the right, the impedance of the coil 194 is increased and the impedance of the coil 196 is decreased, with a reverse action when it moves toward the left. In order to balance the arm 184 and armature 186 so that it is only slightly, if at all, pendulous, the hub carries an adjustable counterweight 198. The result is that slight friction with the rotating shaft 180 will cause the armature 186 to move in the direction of rotation of the shaft whenever reversal of shaft rotation occurs. Adjustable stop screws 200 and 202 serve to limit the movements of the armature.

The fashion in which the relay 144 operates has already been described and there will now be described the function of the armature 186. Let it be supposed that an unbalance of the bridge, due to movement of the core 10, has occurred so that it is necessary for the core 14 to move upwardly to restore balance by increasing the inductance of the upper portion of the coil 4. The relay 144 will then operate to cause the motor 156 to move in the proper direction. As soon as this movement occurs, however, a counterclockwise rotation of the shaft 180 will swing the armature 186 toward the right to increase the impedance of the coil 194 which is in series with the upper end of the coil 4 of the bridge. In effect, therefore, the movement of the core 14 is required to be less than would be required if motion of the armature 86 did not take place or, in fact, with particular adjustments the core 14 might not be required to move at all because the increase of inductance which it should effect might be anticipated. With proper adjustment as hereafter described the result will be that the motor will be reversed earlier than otherwise with the result that the overrun which would occur will be reduced.

In the proper use of the apparatus the stop screws 200 and 202 are so adjusted as to give rise to a maximum periodicity of oscillation of the motor armature, i. e., the reversals of direction of operation of the motor armature will occur at a maximum frequency. Under a condition of balance the motor will thus oscillate back and forth. The oscillations, however, are so reduced through the reduction gearing that even if there was no backlash in the gearing there would only be imperceptible movement of the pen 176. Actually, in view of inevitable (and quite unobjectionable) backlash the pen will normally remain substantially stationary for amplitudes of oscillation of the motor which may be normally achieved. The magnification of movement of the armature 186, however, as compared with the pen will mean that this armature does oscillate to change the inductances of the coils 194 and 196 to maintain the oscillating condition which has been described.

Under the conditions of adjustment indicated, however, there is no interference with rapidity of balance of the system when unbalance occurs. If the core 10 is substantially moved, then irrespective of the change of inductance of the coils 194 and 196 immediately upon operation of the motor, the speed of the motor in effecting restoration of balance is full speed so that the balance is attained very rapidly. It is only when the balance is attained within the desired limits of accuracy that the balance-anticipating means comes into action to prevent overrun by shifting the point of balance to an extent substantially corresponding with the condition that the overrun of the motor after the instants of reversal will be such as to carry the core 14 only imperceptibly beyond the exact balance point.

The fact that the motor is continuously operating means that no dead conditions of the parts occur to produce a dead zone and resulting inaccuracy or lag of indication.

Figures 5, 6:
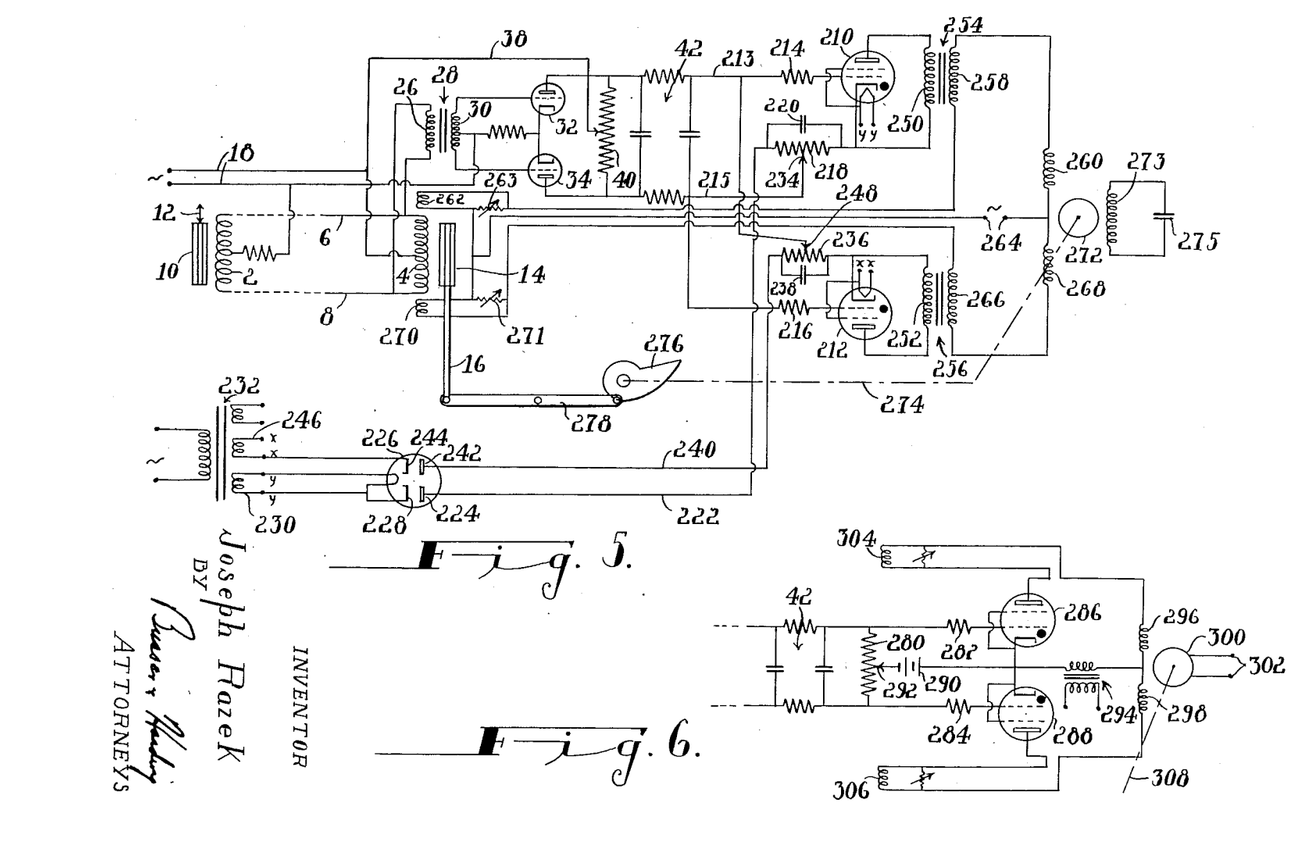
Figure 5 is a diagram also similar to Figure 1 but illustrating a third modification of the invention involving the use of thyratrons for control of a reversible motor and another type of feedback.
Figure 6 is a diagram showing certain modifications which may be made in the system of Figure 5 to control a reversible direct current motor.

Figure 5 illustrates still another modification of the invention. In this figure, the impedance bridge and the phase detecting arrangement involving tubes 32 and 34 is the same as before and consequently these elements are designated by the same reference numerals as in the case of Figure 1. The output from the filter 42 is again a potential, the sign of which depends upon the direction of unbalance of the bridge. The output lines 213 and 215 are in this case used for the control of thyratrons 210 and 212 which may, for example, be of the 2050 type. The line 213 is connected through the resistor 214 to the control grid of the tube 210. The line 215 is connected through the resistor 216 to the control grid of the tube 212. A potentiometer resistance 218 connects the cathode of the tube 210 through the line 222 to the anode 224 of one element of a duplex diode tube 226, the cathode 228 of which is connected to the heater winding 230 of the transformer 232. This heater winding 230 supplies current for the heater of the tube 210, which heater is connected to the cathode of this tube. Connections are made between the points indicated y—y. A condenser 220 shunts the resistance 218, which resistance is connected through an adjustable contact 234 to the line 215.

The cathode of the tube 212 is connected through a potentiometer resistance 236, shunted by the condenser 238, and the line 240 to the anode 242 of the second diode element of the tube 226, the cathode 244 of this diode element being connected to the winding 246 of the transformer 232 which supplies current for the heater of the tube 212 which is connected to its cathode, connections being made between the terminals designated x—x. The resistance 236 is connected through an adjustable contact 248 to the line 213. It will be evident that the arrangement just described provides a symmetrical connection of the thyratrons to the output lines 213 and 215. The diodes in the tube 226 provide suitable bias for the grids of the thyratrons, the amount of this bias for the respective tubes being adjusted through positioning of the contacts 234 and 248.

The anode and cathode of the tube 210 are connected through the winding 250 of a transformer 254 while the anode and cathode of the tube 212 are connected through the winding 252 of the transformer 256.

Another winding 258 of the transformer 254 is in series with the shading coil 260 of a motor 272, a coil 262 inductively related to the bridge impedance coil 4 and a source of alternating current indicated at 264. Similarly a winding 266 of the transformer 256 is in series with a second shading coil 268 of the motor, a coil 270 in inductive relationship with the impedance coil 4 of the bridge and the current source 264. Within the motor itself the main field coil 273 is in inductive relationship with the shading coils 260 and 268, the main field coil 273 being shunted by a condenser 275. It is to be noted that the main field coil 273 is not directly connected to a supply, receiving its current by induction from one or the other of the shading coils.

The motor may be of the conventional Barber Colman or other small wound shading coil, squirrel cage, induction type which normally operates by energization of the field coil 273 from a supply line. In the present case, however, it is used in unconventional fashion as just indicated, the condenser 275 serving to give a proper phase relationship to the main field current induced from the shading coils. The motor reverses depending upon which of the shading coils carries current.

The transformers 254 and 256 are of saturable type, saturation being effected depending upon which of the tubes 210 and 212 is conductive to provide a low resistance circuit for the corresponding winding 250 or 252. If, for example, the tube 210 fires by reason of a sufficient positive potential on its grid, the winding 250 conducts current so that the impedance of the transformer 254 becomes lower so that current flows through the shading coil 260 to cause the motor to rotate in one direction. A similar conductive condition of the tube 212 causes a lowering of impedance of the transformer 256 so that current will flow through the shading coil 268 causing the motor to rotate in the opposite direction. The motor is coupled through a connection indicated at 274, including reduction gearing, to the cam 276 operating through the follower lever 278 and link 16 to position the core 14. As described previously the cam 276 may be cut to secure any desired type of response of the recorder or controller which is driven by the motor and may be of the same construction as previously indicated, the recorder or controller drive being taken directly from the connection 274.

Disregarding for the moment the function of the coils 262 and 270 it will be evident that the system would tend to rebalance the bridge after displacement of the core 10 by the selective firing of the tubes 210 and 212 which are highly sensitive to the departure of the bridge from balance. The parts are, of course, arranged so that the motor 272 drives the core 14 in a rebalancing direction.

If the coils 262 and 270 were omitted the system would hunt if made to provide a high speed of response. However, by coupling the impedance coil 4 to the feed-back coils 262 and 270, balance is anticipated to the extent necessary to minimize the hunting to a negligible degree in the same general fashion as in the case described in connection with Figure 4. When, for example, the tube 218 fires and current flows in series through the transformer winding 258, the shading coil 260 and the coil 262, the last coil induces in the bridge a potential in that sense which tends to cause the bridge to approach balance. Balance is accordingly anticipated and the firing of the tube 210 ceases earlier than would be the case if the feed-back was not provided. Consequently, the overshoot of the balance position is reduced. The result is that the motor 272 is continuously oscillating back and forth but with a small amplitude of oscillations such that in view of the reduction gearing between the motor and the recorder and in view of the back lash in the gearing the oscillations imparted to the stylus are inconsequential and unobservable. In order to adjust the feed-back through the coils 262 and 270 they are shunted by adjustable resistors 263 and 271. In putting the apparatus into operation these resistances are adjusted until the hunting of the recorder is reduced to a minimum, this corresponding to a maximum frequency of the hunting cycle of the motor 272.

The particular type of motor used is not of substantial consequence so long as its direction of rotation can be controlled by the firing of the thyratrons. Instead of the alternating current motor of the type indicated in Figure 5 various other alternating current motors may be used, or a direct current motor may be used as indicated in Figure 6 which illustrates the changes which may be made in the circuit of Figure 5 for the direct current motor operation. In Figure 6 the output of the filter 42 is fed across a resistance 280, the ends of which are respectively connected through the resistors 282 and 284 to the control grids of the thyratrons 286 and 288. A battery 290 provides the proper control grid bias and symmetrical operation conditions are secured by adjustment of a contact 292 along the potentiometer resistance 280. Alternating current is supplied to the anode circuits of the thyratrons through a transformer 294, the respective anodes being in series with the field coils 296 and 298 of the direct current motor, the armature 300 of which is supplied with direct current at 302. Also in the anode circuits are the feed-back coils 304 and 306 corresponding to 262 and 270 of Figure 5 and similarly coupled to the bridge impedance 4.

It will be evident that the arrangement in accordance with Figure 6 has similar characteristics as that of Figure 5. The thyratrons act as rectifiers producing direct current components in the field coils 296 and 298 so that the motor 300 will operate in one direction or the other to correspondingly actuate the connections 308 depending upon which of the tubes 286 and 288 is conductive. The connections 308 correspond to the connections 274 and serve for the drive of the recording, indicating or controlling devices and, through a suitable cam, of the core 14. The alternating components of the pulsating anode currents induce through the coils 304 and 306 balance-anticipating components in the bridge impedance coil 4 to serve to minimize hunting and render it negligible in the fashion previously outlined.

It may be here noted that while inductive feed-back has been described it will be evident that with suitable alternative alternating current connections, which may be made in numerous ways, the feed-back may be directly introduced into the bridge conductively rather than inductively.

From the examples given of the mode of control of reversing operation of the alternating and direct current motors it will be evident to those skilled in the art that many other types of motors may be similarly and equivalently operated to secure the same ultimate results.

It may also be noted that electrical feed-back of the type described in connection with Figures 5 and 6 may be applied to the relay reversing of a motor such as is disclosed in Figure 4 while equally the feed-back arrangement involving variable impedance as in Figure 4 may be substituted for the electrical feed-back of Figures 5 and 6.

Figures 7, 8:
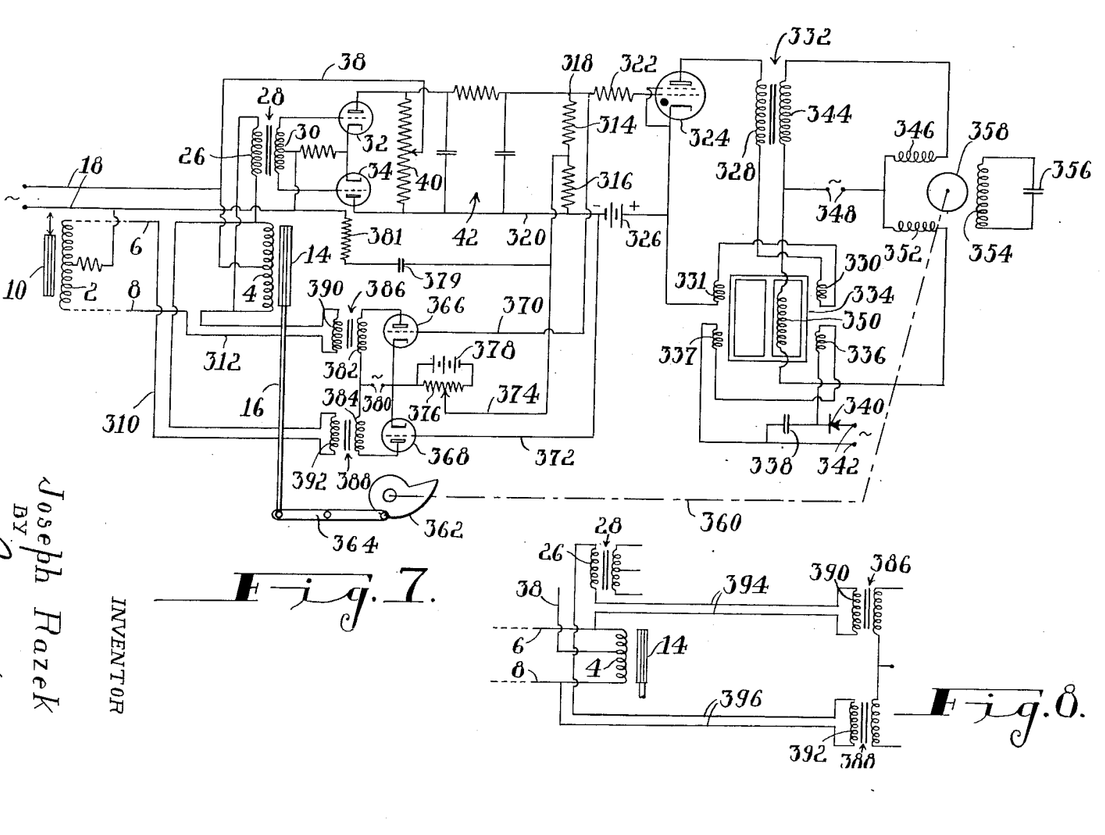
Figure 7 is another diagram similar to Figure 1 illustrating a further modification.
Figure 8 is a diagram illustrating an alternative type of feedback to reduce hunting.

The feed-backs involved in Figures 4, 5 and 6 involve substantially constant effect irrespective of the degree of unbalance of the bridges. In Figure 4, for example, the impedance is shifted by a constant amount irrespective of how far the bridge is off balance. In Figures 5 and 6 the currents fed to the coils 262, 270, 304 and 306 are constant when unbalance occurs irrespective of the degree of unbalance. There will now be described in connection with Figure 7 a system in which the feed-back varies with the degree of unbalance. Figure 7 also indicates how a single thyratron may be used for control purposes. In the systems of Figures 5 and 6 since two thyratrons were used it was possible that a small dead zone might exist in which both thyratrons are either simultaneously fired or simultaneously unfired, it being possible to minimize to a negligible degree by adjustment, but not to completely eliminate, such a dead zone. In the system of Figure 7 such a dead zone becomes impossible.

As will be evident from Figure 7 the impedance bridge and the unbalance detecting means are the same as previously described with the sole exception of the feed-back connections 310 and 312 to which reference will be hereafter made. The filter 42 again provides a potential between the output lines 318 and 320 which is zero at balance and has for unbalance a sign corresponding to the direction of unbalance. Two equal resistances 314 and 316 are connected in series across the lines 318 and 320. A resistor 322 connects the line 318 with the control grid of a thyratron 324 which may, for example, be of the 2050 type. A battery 326 is provided to cause the control grid of the thyratron to be at the firing potential as closely as possible to correspond with zero potential between the lines 318 and 320. The anode to cathode circuit of the thyratron includes in series the secondary coil 328 of a saturable transformer 332 and the saturating coils 330 and 331 of a saturable reactor 334 which will be more fully described. Another pair of saturating coils 336 and 337 of this reactor are in series with a rectifier 340 and the terminals 342 of an alternating current supply. The rectifier 340 may be of a simple diode type or may be of the half wave selenium type. A condenser 338 is bridged across the series arrangement of the coils 336 and 337.

The primary 344 of the transformer 332 is in series with one of the shading coils 346 of a motor 358 and an alternating current source 348. The winding 350 of the reactor 334 is in series with the other shading coil 352 of this motor and the source 348. The motor 358 is illustrated as the same as has been described in connection with Figure 5, i. e., the shading coils 346 and 352 are in inductive relationship with the field 354 which is not energized directly from the source but is shunted by a condenser 356 the size of which determines its characteristics of operation which should be such that the motor reverses and delivers adequate power depending upon which of the shading coils is energized to a major degree.

The saturable reactor may take various forms but preferably involves a core of the type indicated with the winding 350 on the central cross bar thereof. The coils 330 and 331 are desirably identical and are connected in series, being located on the outside pairs of the core frame in such fashion that with respect to inductive relationship with the coil 350 they are in series opposition so that a minimum of inductance between them and the coil 350 exists. The coils 336 and 337 are also desirably identical with each other and also with the coils 330 and 331. They are similarly connected in series opposition with respect to the coil 350 to eliminate substantially any mutual inductance. When carrying current as described hereafter the coils 330 and 331 produce a flux in the same direction about the outside of the core and serve to saturate this portion of the core. The coils 336 and 337 do the same, but their flux under conditions to be described opposes the flux set up by the coils 330 and 331 with the result that when all of the coils are energized the saturating flux in the reactor core is reduced substantially to zero so that the reactance of the coil 350 becomes quite high. The motor connection 360 corresponds to 274 previously described and serves for operation of a recorder, indicator or controller and of the cam 362 of the type previously indicated which acts upon the follower lever 364 to move the core 14 for rebalance of the bridge.

A pair of triodes 366 and 368 have their grids connected by the lines 370 and 372 to the respective lines 318 and 320. A line 374 joins the junction of the resistances 314 and 316 to the common cathode connection of these triodes through a potentiometer 376 energized by a battery 378 for the purpose of adjusting the grid potentials. An alternating current supply 380 connects at one side to the cathodes and at its other side to the anodes of the triodes through the primaries 382 and 384 of the transformers 386 and 388, the secondaries 390 and 392 of which are connected into the bridge at 310 and 312. With certain tubes and circuit arrangements hunting may arise due, probably, to high frequency parasitic oscillations. It has been found possible to prevent this by connecting between the cathode connections of tubes 32 and 34 and the junction of resistances 314 and 316 a series arrangement of a small capacity 379 and a high resistance 381.

The operation of the system of Figure 7 may be described as follows:

Assuming that unbalance has occurred in such direction as to raise the potential of the control grid of the thyratron above the firing point, pulsating direct current will flow in the anode-cathode circuit thereof by induction through the transformer 332. The current thus flowing not only provides a load on the transformer but serves to saturate its core to such extent that the impedance of its primary 344 is quite low so that a relatively heavy current may flow through the shading coil 346 of the motor driving it in such direction as to reduce unbalance. The pulsating anode current through the thyratron also flows through the saturating coils 330 and 331 of the reactor 334. The connections are arranged to be of such polarity that the flux set up by the current flowing through the coils 330 and 331 opposes the similar pulsating flux set up by the pulsating current through the coils 336 and 337, this current also being pulsating due to the rectifier 340. The opposition of these fluxes removes the flux tending toward saturation of the reactor and accordingly the impedance of the coil 350 is quite high. As a result, the current through the shading coil 352 of the motor is rendered very small. The coil 346, therefore, takes full control of the motor rotation.

On the other hand, with unbalance in the opposite direction the thyratron 324 is rendered non-conductive so that no current will flow through the windings 328, 330 and 331. The result so far as the transformer 332 is concerned is a very considerable rise in the impedance of its primary 344 with a resulting reduction of the current through the shading coil 346 to a low value. At the same time, since no current flows through the coils 330 and 331, the saturating flux set up by the pulsating current through the coils 336 and 337 is quite high and the impedance of the coil 350 drops to a low value permitting a relatively heavy current to flow through the shading coil 352 causing the motor to operate in the reverse direction.

It will be evident that no dead zone can occur in this system. The motor is always operating in one direction or the other. It will also be evident that if hunting were not controlled it would occur to an objectionable degree if the response or the system was made sufficiently rapid to be practical.

When the line 318 is positive with respect to the line 320, the grid of the triode 366 will be that the pulsating current in the anode circuit more positive than the grid of the triode 368 so of the former will be substantially greater than the pulsating current in the anode circuit of the latter. The alternating components of these pulsating circuits are fed through the transformers 386 and 388 so that they respectively produce an anticipation of balance for corresponding conditions of unbalance. The signals thus fed back, it will be noted, vary with the degree of unbalance and the result is to minimize overrun in a fashion generally corresponding to that previously described, i. e., so that hunting of the motor will not be apparent in the recorder, indicator or controller. In fact, however, as carried out in practice, a characteristic condition of different and particularly advantageous nature may be secured with this circuit. Without the feed-back system, for example, it was found that the system would hunt at a frequency of about 3 or 4 cycles per second. With the feed-back system suitably adjusted by control of the grid potentials of the triodes this frequency rose to about 10 to 15 cycles per second. This frequency was so high that the reversible motor could not follow it with any substantial amplitude of oscillation with the result that for all practical purposes the motor, when balance is attained, will remain stationary. Nevertheless, forward and reverse impulses are imparted to the rotor of the motor so that it is never actually in stationary condition. But motion is so slight that wear of the motor bearings due to the hunting is practically zero.

While a double feed-back has been illustrated to feed signals to both sides of the bridge the operation is essentially th same if only a single feed-back to one side of the bridge is used. The reason for this may be readily appreciated when it is considered that minimizing of overrun in one direction will place the system so little out of balance that it cannot gain speed in restoration to balance and as a result cannot substantially overrun in the opposite direction. Adjustment is rendered somewhat more critical under these conditions and the actual zero of balance is probably slightly disturbed but, in fact, the disturbance is so slight that it is unnoticeable at a recorder. For similar reasons, single feed-back may be used in the systems, other than that of Figure 7, which have been described as involving feed-back.

It will be noted that in Figure 7 a number of inputs of alternating current are indicated. It is, of course, essential that the alternating current voltages applied should not short circuit each other and accordingly unless isolation is effected through additional transformers in the body of the system separate transformers must be used at the various input points. The triodes 366 and 368 are interconnected to the system involving the triodes 32 and 34 and accordingly the inputs to these pairs must be electrically isolated from each other by using a transformer for supplying current to at least one of them. The voltage appearing across the field coil 354 may be used in the present system to feed the input at 380. As will be readily understood, rearrangements of the system may require either more or less isolation and this need not be described in further detail. Attention must, of course, be paid to the phasing of the various inputs to accord with the connections used, as will be evident to those skilled in this art.

The grid resistor 322 is desirably included in the circuit to the grid of the thyratron 324 to minimize any unbalancing effects of grid current on the feed-back system.

It will be evident that the feed-back of the type illustrated in Figure 7 which is roughly proportional to the degree of unbalance may be applied in the various other systems previously described or, alternatively that the methods of feed-back employed in the other systems may be used in the system of Figure 7 utilizing a single thyratron for the control.

The feed-backs 310 and 312 in the system of Figure 7 and the feed-backs of the systems of Figures 4, 5 and 6 have been shown as being introduced into the bridge. It will be clear that the feed-backs may be introduced into the lines extending from the bridge to the primary 26 of the transformer 28 in each of these systems. This is indicated in Figure 8 in which, the outer portions of the system being similar to that of Figure 7, there is indicated how the lines 394 and 396 may be connected into these bridge output leads, these lines corresponding to 310 and 312 respectively. This feed-back into the output leads of the bridge may also be inductive, corresponding then to what is illustrated in Figures 5 and 6.

What I claim and desire to protect by Letters Patent is:

1. In combination, a gas-filled relay tube having a cathode, an anode and a control grid, a reversible motor having a pair of reversing field coils in respective circuits, means for applying a potential continuously to each of said field coil circuits, a transformer having its primary in the circuit of one of said field coils and its secondary in the anode-cathode circuit of said tube, a saturable reactor having a winding in the circuit of the other of said field coils, having a saturating winding, and having a third winding opposing the last mentioned winding and in the anode-cathode circuit of said tube, and means for supplying a saturating current to the second mentioned winding of said reactor, said elements being so constructed and arranged that when said tube fires the primary impedance of said transformer is low to permit selective major energization of the first of said field coils and current flows through the third winding of said reactor to provide a high impedance of the first winding thereof, and when said tube is not firing the primary impedance of said transformer is high and the impedance of the first winding of said reactor is low to permit selective major energization of the second of said field coils.

2. In combination, a gas filled relay tube, means controlling said tube to attain firing and non-firing thereof, a reversible motor having a pair of reversing field coils in respective circuits, means providing current flow to each of said field coil circuits, and means, including a saturable reactor and a transformer, blocking said current flow to one of said pair of field coils when said tube is firing and blocking said current flow to the other of said pair of field coils when the tube is not firing.

3. A phase sensitive network comprising a pair of high vacuum electron tubes each having a cathode, an anode and a control grid, means for applying an alternating potential between the control grid and cathode of each tube, the grid-cathode potentials of the two tubes being approximately 180° out of phase with each other, means for applying an alternating potential between the anode and cathode of each tube, the anode-cathode potentials of the two tubes being approximately in phase with each other, and normally approximately 90° out of phase with said grid-cathode potentials, the first mentioned means being variable to change the phase of the grid-cathode potential of one of the tubes continuously in the region of said 90° out of phase condition with respect to the phase of the anode-cathode potential of one of the tubes, and means providing an output varying with said change of phase.

4. A phase sensitive network comprising a pair of high vacuum electron tubes each having a cathode, an anode and a control grid, means for applying an alternating potential between the control grid and cathode of each tube, the grid-cathode potentials of the two tubes being approximately 180° out of phase with each other, means for applying an alternating potential between the anode and cathode of each tube, the anode-cathode potentials of the two tubes being approximately in phase with each other, and normally approximately 90° out of phase with said grid-cathode potentials, the first-mentioned means being variable to change the phase of the grid-cathode potential of one of the tubes continuously in the region of said 90° out of phase condition with respect to the phase of the anode-cathode potential of one of the tubes, and means providing a direct output passing through a zero value when the last mentioned grid-cathode potential is approximately 90° out of phase with the last mentioned anode-cathode potential.

5. A phase sensitive network comprising a pair of high vacuum electron tubes each having a cathode, an anode and a control grid, means for applying an alternating potential between the control grid and cathode of each tube, the grid-cathode potentials of the two tubes being approximately 180° out of phase with each other, means for applying an alternating potential between the anode and cathode of each tube, the anode-cathode potentials of the two tubes being approximately in phase with each other, and normally approximately 90° out of phase with said grid-cathode potentials, the first mentioned means being variable to change the phase of the grid-cathode potential of one of the tubes continuously in the region of said 90° out of phase condition with respect to the phase of the anode-cathode potential of one of the tubes, and means, comprising a low-pass filter having its input connected to the tube anodes, providing an output varying with said change of phase.

6. A phase sensitive network comprising a pair of high vacuum electron tubes each having a cathode, an anode and a control grid, means for applying an alternating potential between the control grid and the cathode of each tube, the grid-cathode potentials of the two tubes being approximately 180° out of phase with each other, means for applying an alternating potential between the anode and cathode of each tube, the anode-cathode potentials of the two tubes being approximately in phase with each other, and normally approximately 90° out of phase with said grid-cathode potentials, the first mentioned means being variable to change the phase of the grid-cathode potential of one of the tubes continuously in the region of said 90° out of phase condition with respect to the phase of the anode-cathode potential of one of the tubes, and means, comprising a low-pass filter having its input connected to the tube anodes, providing a direct output passing through a zero value when the last mentioned grid-cathode potential is approximately 90° out of phase with the last mentioned anode-cathode potential.

7. In combination, an impedance network comprising a pair of variable impedances, means for energizing said network, and means responsive to the output of said network to vary one of said impedances to balance the network, said responsive means including a single gas-filled relay tube arranged to fire or not to fire depending upon the network output, a reversible motor controlling one of said impedances to balance said network, said motor having a pair of reversing field coils in respective circuits, means providing current flow to each of said field coil circuits, and mechanically static reversing connections for said motor controlled by the condition of said relay tube to block current flow to one of said field coils when said tube is firing and to the other of said field coils when the tube is not firing, to operate the motor in one direction at substantially full power output whenever the tube is in firing condition and in the other direction at substantially full power output whenever the tube is in non-firing condition.

8. In combination, means including a pair of variable elements to be maintained in predetermined correspondence with each other, a reversible motor arranged to vary one of said elements towards said predetermined correspondence of the elements, said motor having a pair of reversing field coils in respective circuits, means providing current flow to each of said field coil circuits, mechanically static means responsive to the relationship of said elements to block current flow to one or the other of said field coils at all times to drive said motor in one or the other of its directions at substantially full power output at all times to avoid any dead zone in its operation, and means for adjusting said responsive means so that alterations of said current blocking, under conditions corresponding substantially to said predetermined correspondence of said elements, are at a frequency such that alternating movements of said motor are of negligible amplitude.

9. In combination, a single gas-filled relay tube, means controlling said tube to attain firing and non-firing conditions thereof, a reversible motor having a pair of reversing field coils in respective circuits, means providing current flow to each of said field coil circuits, and mechanically static means responsive to said conditions of said tube to block current flow to one of said field coils when said tube is firing and to the other of said field coils when the tube is not firing to drive said motor in one or the other of its directions at substantially full power output at all times to avoid any dead zone in its operation.

JOSEPH RAZEK.

REFERENCES CITED

The following references are of record in the file of this patent:

UNITED STATES PATENTS

| Number | Name | Date |
|---|---|---|
| 1,388,632 | Dean | Aug. 23, 1921 |
| 1,955,322 | Brown | Apr. 17, 1934 |
| 1,977,624 | Davis | Oct. 23, 1934 |
| 2,008,364 | Moseley | July 16, 1935 |
| 2,105,598 | Hubbard | Jan. 18, 1938 |
| 2,109,222 | Ryder | Feb. 22, 1938 |
| 2,131,759 | Satterlee | Oct. 4, 1938 |
| 2,154,375 | Chambers | Apr. 11, 1939 |
| 2,216,301 | Sparrow | Oct. 1, 1940 |
| 2,275,317 | Ryder | Mar. 3, 1942 |
| 2,276,816 | Bagno | Mar. 17, 1942 |
| 2,277,849 | FitzGerald | Mar. 31, 1942 |
| 2,349,963 | Harrison | May 30, 1944 |
| 2,401,168 | Kronenberger | May 28, 1946 |
| 2,415,080 | Bonell | Feb. 4, 1947 |
| 2,421,560 | Haynes | June 3, 1947 |
| 2,422,313 | Rozek | June 17, 1947 |
| 2,426,508 | Isserstedt | Aug. 26, 1947 |
| 2,429,427 | Rieber | Oct. 21, 1947 |
| 2,448,793 | Glass | Sept. 27, 1948 |
| 2,460,064 | Curtis | Jan. 25, 1949 |
| 2,468,447 | Johnson | Apr. 26, 1949 |
| 2,476,849 | Ergen | July 19, 1949 |
| 2,505,258 | Robinette | Apr. 25, 1950 |